United States Patent [19]

Case et al.

[11] Patent Number: 4,862,140
[45] Date of Patent: Aug. 29, 1989

[54] INSTALLABLE HEADLIGHT ALARM SYSTEM

[76] Inventors: Micahel B. Case, 5699 Kanan Rd., Suite 243, Agoura Hills, Calif. 91301; Orando F. Farach, 12226 Victory Blvd. #330, North Hollywood, Calif. 91606

[21] Appl. No.: 187,911

[22] Filed: Apr. 29, 1988

[51] Int. Cl.⁴ ............................................. B60Q 1/00
[52] U.S. Cl. .................................. 340/457.2; 340/457
[58] Field of Search ........................ 340/52 D, 52 R; 307/10 LS; 315/82

[56] References Cited

U.S. PATENT DOCUMENTS

| | | | |
|---|---|---|---|
| 3,905,013 | 9/1975 | Lee | 340/52 D |
| 4,125,824 | 11/1978 | McPherson et al. | 340/52 D |
| 4,194,175 | 3/1980 | Eklund | 340/52 D |
| 4,220,947 | 9/1980 | Yamamoto | 340/52 D |

*Primary Examiner*—Donnie L. Crosland

[57] ABSTRACT

The installable headlight alarm system is a device that detects when the headlights of an automobile are on when the engine is not operating, using only the electrical signals present at the automobile's headlight connector. This method of detection allows the system to be easily installed on any automobile, by attaching it to the connectors of the automobile's headlights.

1 Claim, 1 Drawing Sheet

INSTALLABLE HEADLIGHT ALARM SYSTEM

SUMMARY OF INVENTION

A major object of the invention is to provide a headlight alarm system which can be easily installed by the owner of any automobile. Given the wide range of characteristics of different automobile electrical systems, this can only be accomplished by attaching the system at a location common to all automobiles. The standardized size and shape of headlight connectors provide a suitable location for this installation. The system was therefore designed to detect when the automobile's engine is not operating and the headlights are on, using only the electrical signals present at the headlight connector.

DETAILED DESCRIPTION

Figure 1:
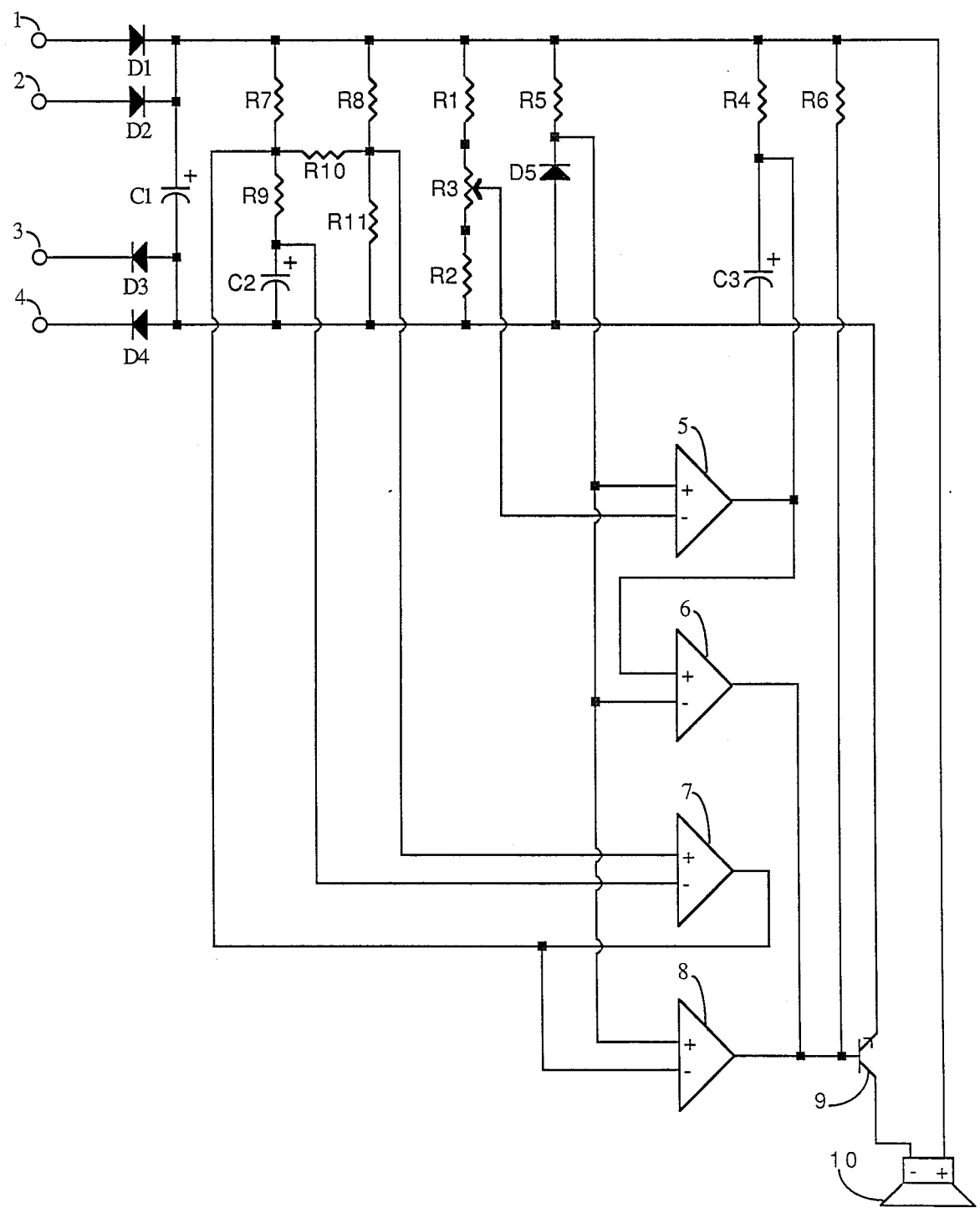
FIG. 1 is a circuit diagram showing the construction of the headlight alarm system electronics.

The unit is installed by first removing the plug attached to the rear of one of the vehicle's headlights. Specially shaped connectors fit between the three male prongs on the back of the headlight and the three female receptacles in the mating plug. There are four of these connectors attached to the device by 1.5 feet of four conductor wire: two red, signifying connection to power, and two black, signifying ground.

Only three of these connectors are used in a particular installation of the device. Which three are used, and which prongs they connect to, is dependant on the wiring configuration in that particular car model. There are only two basic configurations used. In the first, there is one fixed ground prong on the headlight, and the low or high beams are selected by applying power to one of the other two prongs. In this case, one black connector would be attached to the ground prong, and one red connector would be attached to each of the outer prongs. In the second basic configuration, the opposite is true: there is one fixed power prong, and the low or high beams are selected by applying ground to one of the other two prongs. In this case, one red connector would be attached to the power prong, and one black connector to each of the other prongs. The unused connector can be cut off, or simply left hanging. The unit is then attached to the vehicle with provided adhesive strips.

The schematic for the device's circuit is shown in FIG. 1. The two red power connectors 1 and 2 (described above) are buffered by diodes to allow power to the circuit to be provided if either the low or high beams are on, without letting current flow into the other beam. The same is true for the two black ground connectors 3 and 4 in the case of switched ground headlight wiring. After this buffering, the resulting voltage is bypassed by capacitor C1 (to remove alternator ripple) and acts as the power supply for the rest of the circuit.

Comparator 5 performs the main function of the circuit: detecting if the engine is running. When the engine is an automobile is not running, the voltage from the vehicle's battery powers the electrical system at a level of approximately 12 volts. The voltage at the headlight, however, is somewhat less, because the low resistance of the headlight in series with the somewhat lower resistance of the wiring between it and the battery creates a voltage divider. This drops the voltage across the headlight to around 11.5 volts when the engine is not running. Assuming the electrical system is operating correctly, the voltage level is boosted by the alternator whenever the engine is running, allowing the battery to charge at a level of 13.5 to 14.5 volts. This produces a voltage of around 13 volts across the headlight.

The voltage divider formed by resistors R1, R2, and R3 produces an adjustable percentage of the power supply voltage, the absolute level of which will be higher when the the engine is running, and lower when it is not. By adjusting variable resistor R3, the absolute levels provided in these states can be changed across an appropriate range. This divided voltage is then compared to a fixed voltage reference of 6.8 volts (provided by diode D5). If the divided voltage is lower than the reference voltage (engine off), comparator 5 is turned on, and capacitor C3 starts to change through resistor R4. Resistor R3 is adjusted so that the "trip point" is a voltage of 12.2–12.3 volts across the headlight.

The time constant of R4 and C3 is such that approximately 2 seconds pass before the voltage across capacitor C3 reaches 6.8 volts. When this happens, comparator 6 turns on, enabling a beeping alarm tone generated by the remainder of the circuit. This delay provides a "grace period" before the alarm sounds, so the driver has an opportunity to shut of his lights without immediately being assailed by the alarm.

Comparator 7 is a basic oscillator, producing a 1.5 hertz sawtooth wave varying between ground and about 10 volts. When comparator 7 is off, resistors R10 and R11 are essentially in parallel, since the output of the comparator is switched to ground. The voltage divider formed by resistors R8, R10, and R11 provides approximately 4 volts to the positive input of the comparator. Simultaneously, capacitor C2 discharges through resistor R9. When the voltage across capacitor C2 drops below 4 volts, comparator 7 turns on, and the capacitor starts to charge through the series combination of resistors R7 and R9. The comparator does not switch off again immediately, though, because the voltage at the plus input has now changed to approximately 8 volts. This happens because the voltage divider has changed as a result of the comparator being on. Resistors R7 and R10 are now in series with each other, and in parallel together with resistor R8, since the output of the comparator is floating. When the capacitor charges to 8 volts, the comparator switches off again, and the cycle is repeated.

Comparator 8 turns the sawtooth output of the oscillator into a square wave varying between ground and 12 volts, by comparing the oscillator output to the 6.8 volt reference. As the oscillator output crosses the 6.8 volt level, the output of comparator 8 switches off and on, and (if not switched to ground by the output of comparator 6) is alternately switched to ground or pulled to 12 volts by resistor R6. This output switches transistors 9 off and on, switching current flow to the Piezo electric buzzer 10 off and on to produce a beeping tone.

It has been determined experimentally that the Piezo electric buzzer 10 chosen must have a loudness level of at least 100 db to provide a noticeable sound both inside the vehicle and outside (within 10 feet), especially in high ambient noise environments.

What is claimed is:

1. In an automobile headlight alarm system, which connects to an automobile's headlight connector to monitor the voltage level at the connector, and which uses this voltage level to detect that the headlights of the automobile are on when the engine is not operating so that the drive can be alerted by the system, the improvement wherein said system comprises:

means to detect both if the engine of an automobile is not running and if the headlights of the automobile are on by monitoring only the voltage level at the headlight connector;

alarm means connected to the detection means to alert the driver of the automobile when the engine is not operating and the lights are on.

* * * * *